(12) United States Patent
Bilski

(10) Patent No.: US 7,662,285 B2
(45) Date of Patent: Feb. 16, 2010

(54) FILTER DIAPER AND METHOD

(75) Inventor: Gerard W. Bilski, Perrysburg, OH (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/876,156

(22) Filed: Oct. 22, 2007

(65) Prior Publication Data

US 2009/0101597 A1 Apr. 23, 2009

(51) Int. Cl.
*B01D 35/00* (2006.01)
*B01D 35/153* (2006.01)

(52) U.S. Cl. ................................ 210/248; 210/DIG. 17
(58) Field of Classification Search .................. None
See application file for complete search history.

(56) References Cited

U.S. PATENT DOCUMENTS

| | | | | |
|---|---|---|---|---|
| 2,287,526 A | | 6/1942 | Krogman | |
| 2,311,377 A | | 2/1943 | Gaertner | |
| 3,290,870 A | * | 12/1966 | Jensen | 55/486 |
| 3,552,553 A | * | 1/1971 | Reading | 210/484 |
| 3,766,629 A | * | 10/1973 | Lechtenberg | 29/412 |
| 4,020,922 A | * | 5/1977 | Klasel | 184/1.5 |
| 4,372,453 A | * | 2/1983 | Branscum | 215/12.2 |
| 4,376,703 A | * | 3/1983 | Krauss | 210/238 |
| 4,451,368 A | * | 5/1984 | Pandelena et al. | 210/238 |
| 4,498,446 A | * | 2/1985 | Judson | 123/557 |
| 5,169,541 A | * | 12/1992 | Wells | 210/767 |
| 5,271,299 A | * | 12/1993 | Wadsworth | 81/121.1 |
| 5,366,084 A | * | 11/1994 | Post | 206/319 |
| 5,421,223 A | * | 6/1995 | Wawrzyniak | 81/121.1 |
| 5,469,935 A | * | 11/1995 | Hewuse | 184/1.5 |
| 5,484,635 A | * | 1/1996 | Andersen et al. | 428/40.1 |
| 5,623,755 A | * | 4/1997 | Childress et al. | 29/426.5 |
| 5,858,044 A | * | 1/1999 | Nepsund et al. | 55/486 |
| 5,924,342 A | * | 7/1999 | Chou | 81/120 |
| 5,981,910 A | * | 11/1999 | Williams et al. | 219/386 |

(Continued)

FOREIGN PATENT DOCUMENTS

JP 7328338 12/1995

(Continued)

OTHER PUBLICATIONS

United States Patent & Trademark Office Schedule—Liquid Purification or Separation, Oct. 2006, 14 pages.*

(Continued)

*Primary Examiner*—Robert James Popovics
(74) *Attorney, Agent, or Firm*—Cantor Colburn LLP

(57) ABSTRACT

A fluid containment apparatus for use with a fluid filter removably disposed on a substrate is provided. The apparatus comprises a flexible band having a fluid absorbent layer and a fluid barrier layer. The absorbent layer has a first edge, a second edge, an interior side, and an exterior side. The interior side of the absorbent layer is configured to be disposed proximately about an outer surface of the fluid filter to absorb fluid spillage therefrom. The first edge of the absorbent layer is configured to be disposed adjacent to the substrate to absorb fluid spillage therefrom. The barrier layer is joined substantially about the second edge and the exterior side of the absorbent layer. The barrier layer is configured to prevent fluid flow therethrough.

14 Claims, 2 Drawing Sheets

U.S. PATENT DOCUMENTS

| | | | | |
|---|---|---|---|---|
| 6,464,100 B2* | 10/2002 | Canfield | ............... | 220/739 |
| 6,834,838 B2* | 12/2004 | Dennis et al. | ............... | 248/311.2 |
| 6,874,642 B1 | 4/2005 | Malecot et al. | | |
| 6,986,842 B2* | 1/2006 | Bortnik et al. | ............... | 210/232 |
| 7,147,013 B2* | 12/2006 | Zulauf et al. | ............... | 141/86 |
| 7,241,385 B1* | 7/2007 | Cline | ............... | 210/232 |
| 7,340,979 B2* | 3/2008 | Sawyer | ............... | 81/3.4 |
| 2001/0045324 A1 | 11/2001 | Harding, Jr. | | |
| 2003/0047503 A1* | 3/2003 | Bortnik et al. | ............... | 210/315 |
| 2003/0132153 A1* | 7/2003 | Jelten | ............... | 210/232 |
| 2005/0056124 A1* | 3/2005 | Zulauf et al. | ............... | 81/120 |
| 2005/0067343 A1* | 3/2005 | Zulauf et al. | ............... | 210/443 |
| 2009/0101597 A1* | 4/2009 | Bilski | ............... | 210/767 |
| 2009/0184041 A1* | 7/2009 | Hoverson et al. | ............... | 210/232 |
| 2009/0218273 A1* | 9/2009 | Pummill et al. | ............... | 210/248 |

FOREIGN PATENT DOCUMENTS

WO　　9006799 A1　　6/1990

OTHER PUBLICATIONS

United States Patent & Trademark Office Definitions—Liquid Purification or Separation, Oct. 2006, 129 pages.*

* cited by examiner

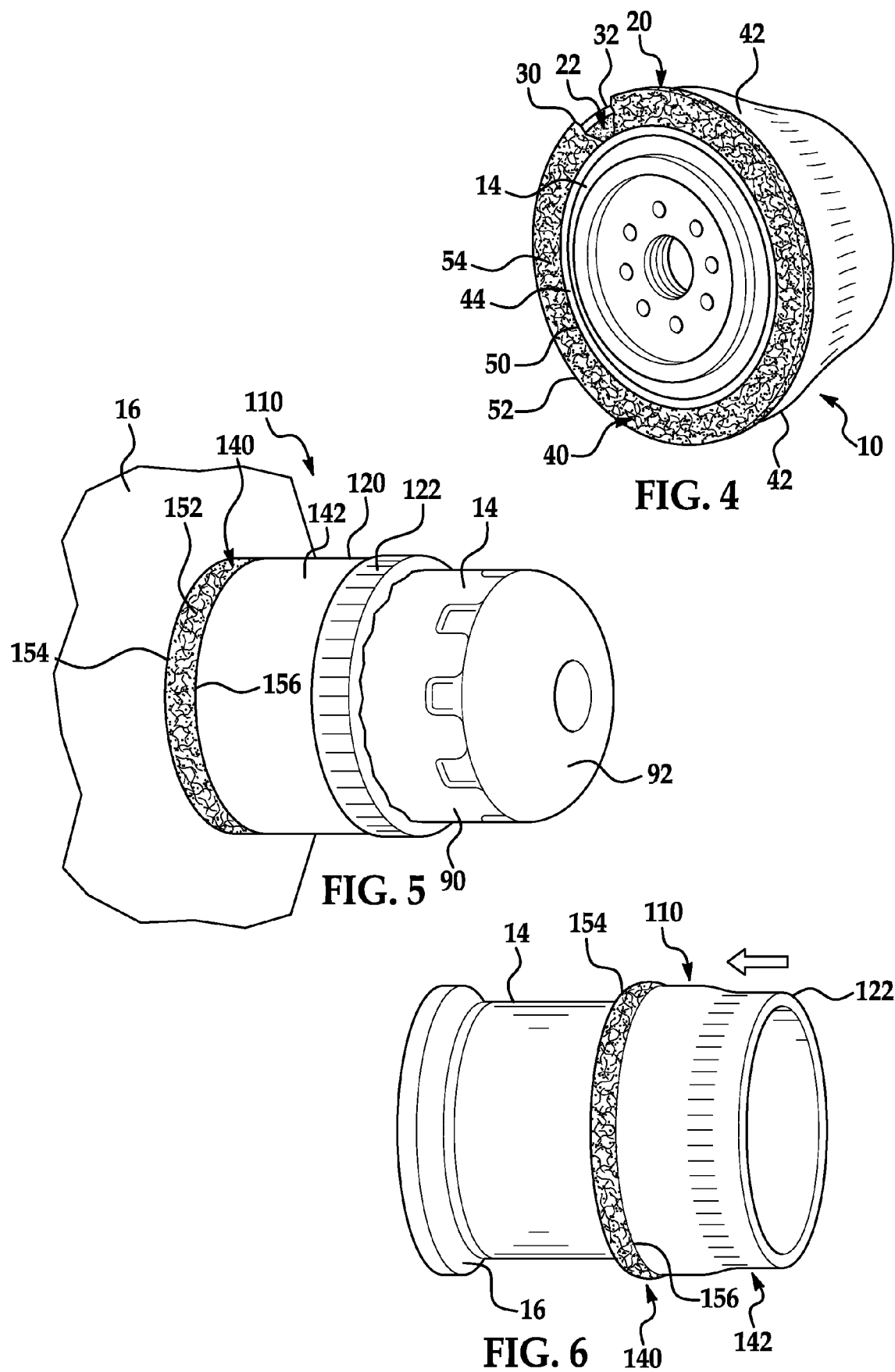

FILTER DIAPER AND METHOD

BACKGROUND

Exemplary embodiments of the present invention relate to a fluid containment apparatus for use with a fluid filter, and to a method of using the described apparatus. More particularly, exemplary embodiments of the present invention relate to a flexible, composite band that installs around a spin-on filter assembly, and to a method of using the flexible band to minimize spillage during removal of the filter assembly.

Spin-on fluid filters are widely used. For example, many engine oil filters and fuel filters in gasoline filling stations are spin-on filters. Periodically, these components require removal and replacement. When changing a filter of this type, however, some fluid will almost invariably drain and spill out of the filter and engine passages when it is removed from its engine block or mounting area. Such spillage can be especially messy and hazardous, often flowing down the side of the filter onto vehicle parts and the hands of the person changing the filter. Moreover, in many vehicle applications, there is insufficient clearance near the filter location to use a rigid device to capture the spill.

Accordingly, it is desirable to provide an apparatus for containing spillage from around the base of a spin-on filter assembly during removal of the filter from a substrate. It is also desirable to provide a fluid containment apparatus that can both absorb and contain fluid spillage during removal of a fluid filter from a substrate.

SUMMARY OF THE INVENTION

In accordance with exemplary embodiments of the present invention, a fluid containment apparatus for use with a fluid filter removably disposed on a substrate is provided. The apparatus comprises a flexible band having a fluid absorbent layer and a fluid barrier layer. The absorbent layer has a first edge, a second edge, an interior side, and an exterior side. The interior side of the absorbent layer is configured to be disposed proximately about an outer surface of the fluid filter to absorb fluid spillage therefrom. The first edge of the absorbent layer is configured to be disposed adjacent to the substrate to absorb fluid spillage therefrom. The barrier layer is joined substantially about the second edge and the exterior side of the absorbent layer. The barrier layer is configured to prevent fluid flow therethrough.

In accordance with exemplary embodiments of the present invention, a method of capturing fluid spillage from a fluid filter removably disposed on a substrate is provided. The method comprises disposing a flexible band having a fluid absorbent layer configured to absorb fluid spillage, a permeable absorbent-protecting layer joined to an interior side of the absorbent layer, and a fluid barrier layer on the fluid filter such that the absorbent-protecting layer of the absorbent layer is disposed about an outer surface of the fluid filter, and a first edge of the absorbent layer is disposed adjacent to the substrate. The absorbent-protecting layer is configured to pass fluid spillage from the fluid filter to the interior side of the absorbent layer. The barrier layer is joined to an exterior side of the absorbent layer and configured to prevent fluid flow therethrough. The method further comprises removing the fluid filter from the substrate; absorbing fluid spillage within the fluid absorbent layer; and containing fluid absorbed within the absorbent layer with the fluid barrier layer.

BRIEF DESCRIPTION OF THE DRAWINGS

FIG. 4 is a cross-sectional view of the exemplary fluid containment apparatus of FIG. 1 disposed on an exemplary fluid filter;

FIG. 5 is a side view of an alternative exemplary embodiment of a fluid containment apparatus in accordance with the present invention disposed on an exemplary fluid filter and substrate; and FIG. 6 is a side view of the alternative exemplary fluid containment apparatus of FIG. 4 being disposed on an exemplary fluid filter and substrate.

DETAILED DESCRIPTION OF EXEMPLARY EMBODIMENTS

Figure 1:
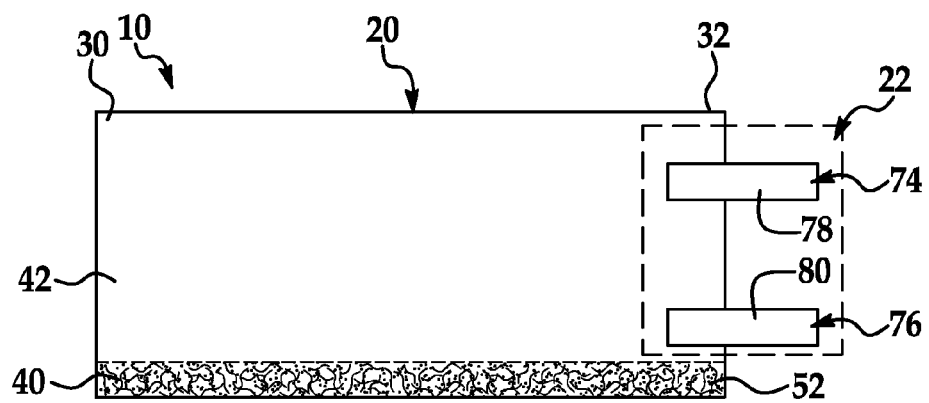
FIG. 1 is a side view of an exemplary embodiment of a fluid containment apparatus in accordance with the present invention.
Figure 2:
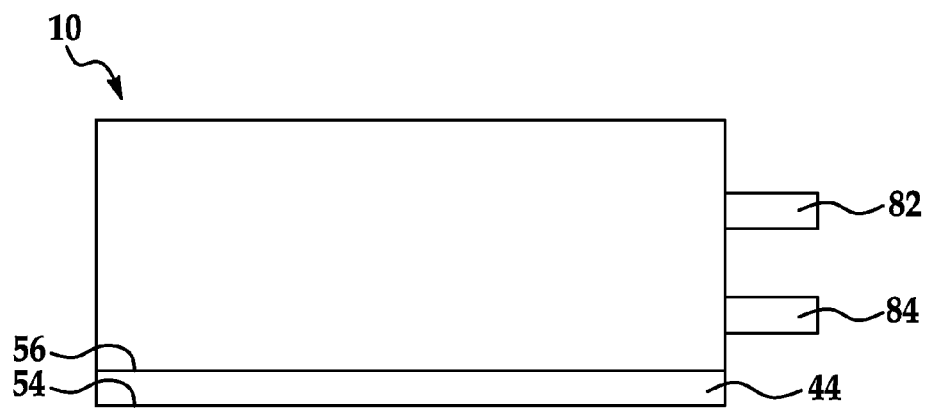
FIG. 2 is an opposing side view of the exemplary fluid containment apparatus of FIG. 1.
Figure 3:
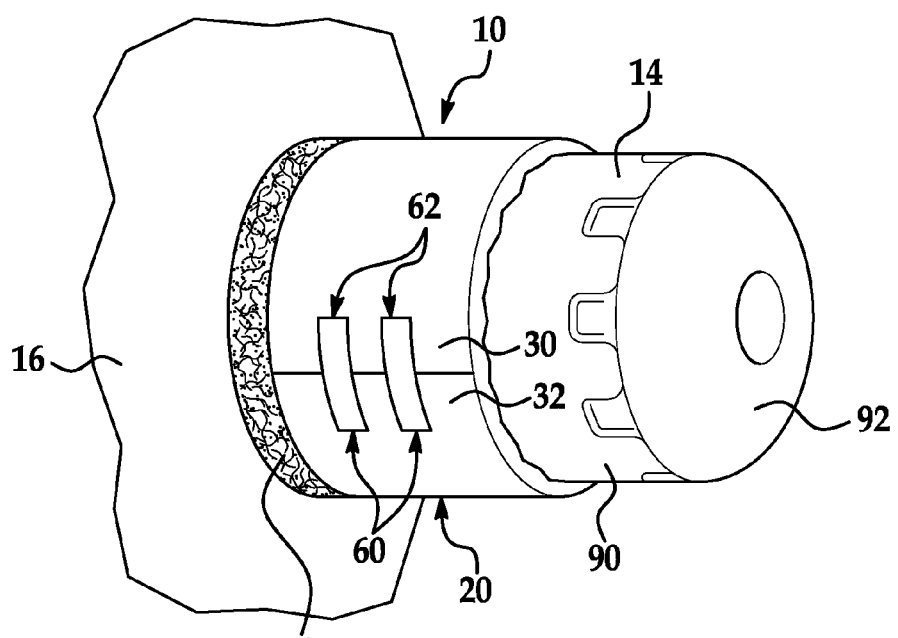
FIG. 3 is a side view of the exemplary fluid containment apparatus of FIG. 1 disposed on an exemplary fluid filter and substrate.

Exemplary embodiments of fluid containment apparatuses in accordance with the present invention will now be described with reference to the drawings. Referring to FIGS. 1-4, a fluid containment apparatus 10, in accordance with a first exemplary embodiment of the present invention, is shown. The exemplary apparatus can be used to minimize spillage during the removal of a spin-on fluid filter 14 (FIG. 3) from an engine block or other substrate 16. As illustrated in FIG. 3, filter 14, which has a generally cylindrical shape, includes an outer wall 90 and a base plate 92. To removably secure filter 14 within substrate 16, threads of the filter are mated within receiving threads of the substrate. An apparatus according to this first exemplary embodiment includes a securing member 22 secured to a flat, flexible band 20 of material.

Exemplary flexible band 20 is provided to capture fluid spillage during removal of filter 14 from substrate 16. Flexible band 20 has first and second ends 30, 32 and includes a fluid absorbent layer 40, a fluid barrier layer 42, and an absorbent protecting layer 44. Flexible band 20 is configured to be manually bent into a cylindrical shape and circumferentially disposed around filter 14. The flexible band is thus of a sufficient length to be disposed around filter 14 such that first end 30 can be disposed proximate second end 32, as best viewed in FIG. 4. Moreover, flexible band 20 is configured to be disposed around filters of varying cross-sectional diameters. For example, flexible band 20 can be disposed around a filter in which first end 30 overlaps second end 32, or, as shown in FIG. 4, a filter in which first end 30 is proximate, but does not overlap, second end 32.

Absorbent layer 40 is provided for absorbing spillage emanating from filter 14 and from engine passages when the filter is removed from the substrate 16. Absorbent layer 40 includes an interior side 50, an exterior side 52, a first edge 54, and a second edge 56. Second edge 56 is configured to be disposed against fluid filter 14, and first edge 54 is configured to be disposed against both the fluid filter and substrate 16. In exemplary embodiments, the dimensions of absorbent layer 40 (for example, the thickness between interior side 50 and exterior side 52 and/or the height between first edge 54 and second edge 56) can vary to ensure provide a suitable amount of spillage-absorbing capacity for particular applications. Therefore, the relative dimensions shown for the exemplary embodiments illustrated in the accompanying drawings should be considered non-limiting.

In exemplary embodiments, absorbent layer 40 can comprise a pad made from a non-woven fabric material, a sponge material, or an aggregate material that can include one or more fibers. In a non-limiting example, absorbent layer 40 can comprise cellulose and melt-blown polypropylene. In exemplary embodiments, the absorbent layer can be made from synthetic high-molecular weight polymers such as polypropylene, polystyrene, polyurethane foam, polymethyl (meth)acrylate, and polyacrylic acid. In other exemplary embodiments, the absorbent layer can be made from naturally occurring polymeric materials such as pulp fibers, cotton fibers, cellulose, modified celluloses, starches, dextrins, and gums. In other exemplary embodiments, the absorbent layer can be made from other fluid absorbent polymers or materials, or combinations of the foregoing polymers and materials. The material used to form the absorbent layer can be selected for its ability to absorb the target fluid, which may be oil, gasoline, fuel oil, diesel fuel, or similar liquid.

In exemplary embodiments, barrier layer 42 is provided to maintain a fluid barrier between absorbent layer 40 and an outer portion of flexible band 20. In the exemplary embodiment illustrated in FIGS. 1-4, barrier layer 42 is secured to the second edge 56 and the exterior side 52 of absorbent layer 40 such that absorbent layer 40 is at least partly disposed inside barrier layer 42. First edge 54 of absorbent layer 40 extends outwardly from barrier layer 42 to contact substrate 16 independently. In alternative exemplary embodiments, barrier layer 42 can have an edge in common with first edge 54 of absorbent layer 40 such that the barrier layer and the absorbent layer mutually contact substrate 16.

In exemplary embodiments, barrier layer 42 is secured to absorbent layer 40 using an adhesive disposed between barrier layer 42 and absorbent layer 40. In other exemplary embodiments, barrier layer 42 can be secured to the absorbent layer 40 by interweaving second edge 56 and exterior side 52 of the absorbent layer with barrier layer 42. In exemplary embodiments, barrier layer 42 is can be made from an impermeable material such as polyethylene, polypropylene, polybuthylene, polymethylpentene, polytetrafluoroethylene, polyvinyl chlorides, polyimide materials, or combinations thereof. In other exemplary embodiments, the barrier layer can be made from other impermeable materials.

In exemplary embodiments, absorbent-protecting layer 44 is joined to interior side 50 of absorbent layer 40 to maintain a permeable fluid barrier that protects interior side 50 from direct contact with spillage from fluid filter 14 and substrate 16. Absorbent protecting layer 44 is configured to be disposed against fluid filter 14 and substrate 16. In exemplary embodiments, absorbent-protecting layer 44 can be secured to interior side 50 of absorbent layer 40 to extend from second edge 56 toward first edge 54. In exemplary embodiments, absorbent-protecting layer can further extend across first edge 54 to exterior side 52 such that the permeable fluid barrier provided also at least partially protects first edge 54 and exterior side 52 of absorbent layer 40 from direct contact with spillage from fluid filter 14 and substrate 16. In exemplary embodiments, absorbent-protecting layer 44 can be made from a permeable material such as a non-woven synthetic material like a spun-bonded polyester, nylon, or some other synthetic fiber, which can be very thin with visibly open pores, or combinations thereof. In other exemplary embodiments, absorbent-protecting layer 44 can be made from other permeable materials.

In exemplary embodiments, absorbent-protecting layer 44 is secured to absorbent layer 40 using an adhesive disposed between absorbent-protecting layer 44 and interior side 50 of absorbent layer 40. In other exemplary embodiments, absorbent-protecting layer 44 can be secured to absorbent layer 40 by interweaving absorbent layer 40 with absorbent-protecting layer 44. In exemplary embodiments, absorbent-protecting layer 44 is also secured to an inner surface of barrier layer 42 adjacent to or above second edge 56 of absorbent layer 40 such that at least a section of interior side 50 of the absorbent layer that extends proximately from second edge 56 toward first edge 54 is not directly exposed to spillage from fluid filter 14. In exemplary embodiments, absorbent-protecting layer 44 can be secured to the inner surface of barrier layer 42 using an adhesive disposed between absorbent-protecting layer 44 and the inner surface of barrier layer 40. In other exemplary embodiments, absorbent-protecting layer 44 can be secured to the inner surface of barrier layer 42 by interweaving barrier layer 42 with absorbent-protecting layer 44.

In alternative exemplary embodiments in which fluid absorbent layer 40 is provided with a sufficiently sturdy and resistant construction, fluid containment apparatus 10 does not include absorbent-protecting layer 44. In such embodiments, interior side 50 of absorbent layer is configured to be disposed against fluid filter 14 and mounting member 16.

In the present exemplary embodiment, securing member 22 is provided to maintain apparatus 10 in an operating position to capture fluid spillage from filter 14 and from substrate 16. In particular, securing member 22 is secured at a first end 60 of the securing member to first end 30 of flexible band 20. Securing member 22 has a second end 62 configured to secure securing member 22 to second end 32 of flexible band 20. Securing member 14 includes first and second adhesive strips 74, 76. Adhesive strips 74, 76 respectively include backing surfaces 78, 80 and adhesive surfaces 82, 84. Backing surfaces 78, 80 are configured to provide structural support to maintain securing member 22 in proximate relation when second end 62 of the securing member is secured to second end 32 of a flexible band 20. Adhesive layers 82, 84 are configured to adhesively bond backing surfaces 78, 80 to flexible band 20. In alternative exemplary embodiments, securing member 22 can utilize another engagement mechanism, such as mechanical fasteners like buttons, snaps, or zippers, in place of adhesive strips 74, 76.

In exemplary embodiments, filter 14 can comprise an oil filter integrated into a vehicle engine (not shown), and substrate 16 can be part of the engine's crankshaft. During the operation of an engine, the oil filter would thus receive oil from the engine and filter particles from the oil, thereby cleaning the oil. Both the oil filter and the substrate can retain oil when the engine ceases operation, and oil can spill from the filter as well as the substrate and other engine passages when the filter is removed from the substrate. Therefore, exemplary embodiments of fluid containment apparatuses in accordance with the present invention can be disposed against the oil filter and the substrate during removal of the filter from the substrate so as to receive oil spillage from the filter, the substrate, and engine passages through an absorbent-protecting layer and/or a fluid absorbent layer, absorb the oil spillage within the fluid absorbent layer, and then contain the oil spillage within the absorbent layer using a fluid barrier layer.

Referring now to FIG. 5-6, another exemplary embodiment of a fluid containment apparatus 110 in accordance with the present invention is shown. The apparatus is shown surrounding a filter 14 that is mounted on a substrate 16. It will be understood that the substrate 16 includes conventional fluid passages therein.

Apparatus 110 of the present exemplary embodiment is similar to apparatus 10 of the exemplary embodiment described above with reference to FIG. 1-4 in that apparatus 110 comprises a flexible band 120 having a fluid absorbent layer 140 and a fluid barrier layer 142. The compositions of absorbent layer 140 and barrier layer 142 can be the same as that described herein in connection with absorbent layer 40 and barrier layer 42 of the exemplary embodiment of FIGS. 1-4. In exemplary embodiments, apparatus 110 can also include an absorbent-protecting layer that can be the same as that described herein in connection with absorbent-protecting layer 44 of the exemplary embodiment of FIGS. 1-4.

In contrast to flexible band 20 provided in the exemplary embodiment of FIGS. 1-4, flexible band 120 has a closed annular shape. In this manner, flexible band 120 is configured to be circumferentially disposed around the outer surface of filter 14 by sliding the flexible band along a periphery of the filter 14 toward substrate 16 until a first edge 154 of absorbent layer 140 contacts the substrate, as illustrated in FIG. 6.

Moreover, the present exemplary embodiment also includes an elastic member 122 secured to barrier layer 142 proximate a second edge 156 of absorbent layer 140. In alternative exemplary embodiments, elastic member 122 can be disposed on other locations of flexible band 120. Elastic member 122 has a pre-stretched cross-sectional diameter that is smaller than the cross-sectional diameter of filter 14. After being stretched, elastic member 122 is configured to contract to a pre-stretched position. This enables elastic member 122 to extend around and squeeze the outer surface of filter 14 to secure flexible band 120 to the filter when the flexible band is circumferentially disposed around the outer surface of the filter. Further, elastic member 122 can secure flexible band 120 to filters of varying cross-sectional diameters. In exemplary embodiments, elastic member 122 can be made of rubber. In other exemplary embodiments, elastic member 122 can be made of vinyl polymers, urethanes, oil-tolerant elastomers, and mixtures thereof.

In accordance with another exemplary embodiment of the present invention, a method of minimizing fluid spillage during removal of a fluid filter from an engine block or other substrate is provided. The present exemplary method employs a fluid containment apparatus that comprises a flexible band having a fluid absorbent layer configured to absorb fluid spillage, an absorbent-protecting layer that is joined to an interior side of the fluid absorbent layer to maintain a permeable fluid barrier that protects the interior side, and a fluid barrier layer that is joined to an exterior side of the absorbent layer. In exemplary embodiments, the method can include a step of disposing the fluid containment apparatus on the fluid filter to receive fluid spillage from the filter, substrate, and engine passages when the filter is removed from the substrate. The fluid containment apparatus can be disposed on the filter toward the substrate on which the filter is mounted so that a first edge of the absorbent layer contacts the substrate and the absorbent-protecting layer is circumferentially disposed adjacently around the outer surface of the filter proximate the substrate.

In exemplary embodiments, the flexible band can comprise a substantially flat section of material having open first and second ends, as described in relation to the apparatus of the exemplary embodiment illustrating in FIGS. 1-4. In this case, circumferentially disposing the absorbent-protecting layer of the fluid absorbent layer around the outer surface of the filter would involve bending the band into an annular shape around the outer surface of the filter and then securing the first end to the second end. In other exemplary embodiments, the flexible band can have a closed annular shape, as described in relation to the apparatus of the second exemplary embodiment. In this case, circumferentially disposing the absorbent-protecting layer of the fluid absorbent layer around the outer surface of the filter involves sliding the band along a periphery of the filter toward the substrate until the first edge of the absorbent layer contacts the substrate.

In exemplary embodiments, the fluid containment apparatus can further include an elastic member that is secured to the barrier layer proximate a second edge of the absorbent layer opposite the first edge. When the absorbent-protecting layer is circumferentially disposed around the outer surface of the filter, the elastic member extends around and squeezes the outer surface of the filter to secure the band to the filter.

In the present exemplary embodiment, with the absorbent-protecting layer and the absorbent layer that is joined thereto being disposed snugly against the substrate (and in some exemplary embodiments, sufficiently snug so as to compress an absorbent layer having shape memory against the shape of the substrate), the filter is rotated to begin unscrewing it from the substrate. In one example application, the filter is rotated in a counter-clockwise direction for removal. When the filter is removed, some fluid can be expected to spill forth from the filter, substrate, and engine passages proximate the substrate. The first edge receives at least part of that spillage so that it can be absorbed within the absorbent layer. Part of the spillage can also be received by the absorbent-protecting layer, in which case the spillage gradually passes through the permeable barrier to the interior side of the absorbent layer to be absorbed within the absorbent layer. To minimize spillage, as soon the filter is removed from the substrate, the filter can be quickly oriented with the openings of the base plate facing upwardly so that the fluid spillage is retained therein as much as possible.

After removal, the fluid absorbed in the absorbent layer is contained therewithin by the fluid barrier layer. The barrier layer can be adhesively bonded to the absorbent layer. The filter can then be disposed of in approved fashion, as can the fluid containment apparatus.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A fluid containment apparatus for use with a fluid filter removably disposed on a substrate, the apparatus comprising:
a flexible band having a fluid absorbent layer, a permeable absorbent-protecting layer, and a fluid barrier layer, the absorbent layer having a first edge, a second edge, an interior side, and an exterior side, the absorbent-protecting layer having an interior side and an exterior side, the interior side of the absorbent layer being joined to the exterior side of the absorbent-protecting layer to absorb fluid spillage therefrom, the interior side of the absorbent-protecting layer being configured to be disposed adjacently about an outer surface of the fluid filter to pass fluid spillage therefrom to the absorbent layer, the first edge of the absorbent layer being configured to be disposed adjacent to the substrate to absorb fluid spillage therefrom, the barrier layer being joined substantially about the second edge and the exterior side of the absorbent layer, the barrier layer being configured to prevent fluid flow therethrough.

2. The apparatus of claim 1, wherein the barrier layer is adhesively bonded to the absorbent layer.

3. The apparatus of claim 1, wherein the interior side of the absorbent layer is adhesively bonded to the absorbent-protecting layer.

4. The apparatus of claim 1, wherein the first edge of the absorbent layer extends outwardly from the barrier layer to contact the substrate independently.

5. The apparatus of claim 1, wherein the barrier layer has an edge in common with the first edge of the absorbent layer such that the barrier layer and the absorbent layer are mutually adjacent to the substrate.

6. The apparatus of claim 1, wherein the flexible band is configured to be circumferentially disposed around the outer surface of the fluid filter, and wherein the flexible band comprises a closed annular shape.

7. The apparatus of claim 1, wherein the flexible band is configured to be circumferentially disposed around the outer surface of the fluid filter, and wherein the flexible band comprises a substantially flat section of material having first and second open ends, the first open end being configured secure to the second open end when the flexible band is manually bent into an annular shape.

8. The apparatus of claim 7, further comprising at least one adhesion strip disposed on the first open end for securing the first open end to the second open end.

9. The apparatus of claim 1, wherein the absorbent layer comprises an absorbent material selected from polypropylene, polystyrene, polyurethane foam, polymethyl(meth)acrylate, polyacrylic acid, pulp fibers, cotton fibers, cellulose, modified celluloses, starches, dextrins, gums, and combinations thereof, wherein the barrier layer comprises an impermeable material selected from polyethylene, polypropylene, polybuthylene, polymethylpentene, polytetrafluoroethylene, polyvinyl chlorides, polyimide materials, and combinations thereof, and wherein the absorbent-protecting layer comprises a permeable material selected from spun-bonded polyester, nylon, other synthetic fibers, and combinations thereof.

10. The apparatus of claim 1, further comprising an elastic member secured to the barrier layer proximate the second edge of the absorbent layer, the elastic member being configured to extend around and compress the outer surface of the fluid filter to secure the flexible band to the fluid filter.

11. The apparatus of claim 10, wherein the elastic member comprises a material selected from the group consisting of rubber, vinyl polymers, urethanes, oil-tolerant elastomers, and mixtures thereof.

12. The apparatus of claim 1, wherein the first edge of the absorbent layer is joined substantially to the exterior side of the absorbent-protecting layer to absorb fluid spillage therefrom.

13. A fluid containment apparatus for use with a fluid filter removably disposed on a substrate, the apparatus comprising:
a flexible band having a fluid absorbent layer and a fluid barrier layer, the fluid absorbent layer being adhesively bonded to the fluid barrier layer and having a first edge, a second edge, an interior side, and an exterior side, the interior side of the fluid absorbent layer being configured to be disposed proximately about an outer surface of the fluid filter to absorb fluid spillage therefrom, the first edge of the fluid absorbent layer being configured to be disposed adjacent to the substrate to absorb fluid spillage therefrom, the barrier layer being joined substantially about the second edge and the exterior side of the fluid absorbent layer, the barrier layer being configured to prevent fluid flow therethrough; and
an elastic member secured to the barrier layer proximate the second edge of the fluid absorbent layer, the elastic member being configured to extend around and compress against the outer surface of the fluid filter to secure the flexible band to the fluid filter.

14. A fluid containment apparatus for use with a fluid filter removably disposed on a substrate, the apparatus comprising:
a flexible, substantially flat band having a first open end, a second open end, a fluid absorbent layer, and a fluid barrier layer, the first open end being configured to be secured to the second open end when the flexible band is manually bent into an annular shape, the flexible band being configured to be circumferentially disposed around an outer surface of the fluid filter, the fluid absorbent layer having a first edge, a second edge, an interior side, and an exterior side, the interior side of the fluid absorbent layer being configured to be disposed proximately about the outer surface of the fluid filter to absorb fluid spillage therefrom, the first edge of the fluid absorbent layer being configured to be disposed adjacent to the substrate to absorb fluid spillage therefrom, the barrier layer being joined substantially about the second edge and the exterior side of the fluid absorbent layer, the barrier layer being configured to prevent fluid flow therethrough.

* * * * *